United States Patent
Hua et al.

(10) Patent No.: US 11,651,481 B2
(45) Date of Patent: May 16, 2023

(54) QUATERNION MULTI-DEGREE-OF-FREEDOM NEURON-BASED MULTISPECTRAL WELDING IMAGE RECOGNITION METHOD

(71) Applicant: NANTONG UNIVERSITY, Nantong (CN)

(72) Inventors: Liang Hua, Nantong (CN); Hongkun Zhu, Nantong (CN); Yuqing Liu, Nantong (CN); Ling Jiang, Nantong (CN); Ran Chen, Nantong (CN); Kexin Shi, Nantong (CN)

(73) Assignee: NANTONG UNIVERSITY, Nantong (CN)

( * ) Notice: Subject to any disclaimer, the term of this patent is extended or adjusted under 35 U.S.C. 154(b) by 0 days.

(21) Appl. No.: 17/288,558

(22) PCT Filed: Oct. 28, 2020

(86) PCT No.: PCT/CN2020/124188
§ 371 (c)(1),
(2) Date: Apr. 25, 2021

(87) PCT Pub. No.: WO2021/068982
PCT Pub. Date: Apr. 15, 2021

(65) Prior Publication Data
US 2022/0414857 A1   Dec. 29, 2022

(30) Foreign Application Priority Data
Mar. 19, 2020   (CN) .......................... 202010197835.6

(51) Int. Cl.
*G06T 7/00* (2017.01)
*G06V 10/74* (2022.01)
*G06V 10/82* (2022.01)

(52) U.S. Cl.
CPC .......... *G06T 7/0004* (2013.01); *G06V 10/761* (2022.01); *G06V 10/82* (2022.01);
(Continued)

(58) Field of Classification Search
CPC .................................... G06T 3/40; G06T 1/20
See application file for complete search history.

(56) References Cited

U.S. PATENT DOCUMENTS

| | | | | |
|---|---|---|---|---|
| 6,064,759 A * | 5/2000 | Buckley | ............... | G01B 11/024 348/125 |
| 8,149,409 B2 * | 4/2012 | Lim | ....................... | G01N 21/55 356/601 |

(Continued)

*Primary Examiner* — Yosef Kassa
(74) *Attorney, Agent, or Firm* — CBM Patent Consulting, LLC

(57) ABSTRACT

Disclosed is a quaternion multi-degree-of-freedom neuron-based multispectral welding image recognition method, comprising: using three cameras having different wavebands to obtain multispectral weld pool images, and respectively performing pre-processing and edge extraction on the weld pool images having the different wavebands obtained at a same moment by the three cameras; establishing a quaternion-based multispectral weld pool image edge model; extracting low-frequency features after a quaternion discrete cosine transform; using a quaternion-based multi-degree-of-freedom neuron network to perform classification, training and recognition on edge features of the multispectral weld pool images. Compared to traditional means, the present invention has multiple recognition information sources, strong anti-interference capabilities and high recognition accuracy.

2 Claims, 4 Drawing Sheets

(52) U.S. Cl.
CPC ............... *G06T 2207/20084* (2013.01); *G06T 2207/30152* (2013.01)

(56) References Cited

U.S. PATENT DOCUMENTS

| | | | |
|---|---|---|---|
| 9,120,286 B2 * | 9/2015 | Dailey | B32B 1/00 |
| 9,399,269 B1 * | 7/2016 | Zediker | E21B 29/00 |
| 10,414,003 B2 * | 9/2019 | Goncharov | B23K 35/3066 |
| 10,952,488 B2 * | 3/2021 | Hsu | G06T 3/40 |

\* cited by examiner

Binarization result of weld pool images

Morphological operation result of weld pool images

Area threshold filtering result of weld pool images

Edge extraction result of weld pool images

Complete penetration　　　Incomplete penetration

Complete penetration　　　Incomplete penetration

QUATERNION MULTI-DEGREE-OF-FREEDOM NEURON-BASED MULTISPECTRAL WELDING IMAGE RECOGNITION METHOD

TECHNICAL FIELD

The invention relates to the technical field of laser welding image recognition methods, in particular to a quaternion multi-degree-of-freedom neuron-based multispectral welding image recognition method.

DESCRIPTION OF THE RELATED ART

Laser welding technology is one of the current advanced manufacturing technologies, which is in the ascendant in various industries. Compared with other welding methods, laser welding has the advantages of high efficiency, speed, high quality, reliability, small seam, flatness, energy concentration, electromagnetic interference prevention, and wide range of welding materials. Therefore, it is of great significance to realize the online real-time detection and judgment of laser welding quality. The traditional analysis method based on the visual system to observe the behavior of the molten pool is basically based on the visible light image or processing based on a single waveband radiation information, but the visible light visual range is easily interfered by arc light, etc., and it is difficult to extract the welding area The key features of the image, and the single band of visual information, lacks the overall information of the entire molten pool and the detection of special spectral information. Therefore, an improved technology is urgently needed to solve this problem in the prior art.

Technical Issues

The purpose of the present invention is to provide a quaternion multi-degree-of-freedom neuron-based multispectral welding image recognition method, starting from the edge information of the molten pool image, analyzing and identifying the penetration state corresponding to the molten pool image during welding, and solving In the technology, the identification information is susceptible to interference and the reliability of the identification result is not high, so as to solve the problems raised in the background art.

Technical Solution

A quaternion multi-degree-of-freedom neuron-based multispectral welding image recognition method, which is characterized in that: a steel plate to be welded is laid flat below; laser welding equipment is located above and faces the steel plate; the three cameras equipped with glass filters and protective glasses are arranged side by side and vertically aligned with a portion to be subject to laser welding; an upper computer uses the LabVIEW program to acquire and control the states of the three cameras through the image acquisition card; a corresponding power supply device provides power.

The multispectral weld pool images obtained by the three cameras are processed by the MATLAB program, to obtain and display the weld pool image recognition result. The processing is divided into two parts:

The first part is to extract the low-frequency features of the weld pool images, comprising:

A, preprocessing the weld pool images captured by the three cameras at the same moment, wherein an original image is binarized first, then is expanded and corroded by means of morphological operation, and then subject to area threshold filtering to complete the image preprocessing, and finally, weld pool edge information is extracted from the preprocessed images by scanning from outside to inside line by line;

B, establishing a quaternion-based multispectral weld pool image edge model, wherein for sampling points at any moment, the distance data from an edge to a centroid of each of the weld pool images with different spectra obtained by the three cameras can be expressed as a pure imaginary quaternion, so the distance sequences from the edge to the centroid of each of the weld pool images with three spectral ranges corresponding to different categories can be combined and mapped on a quaternion space, and the change of a quaternion vector sequence can be characterized as the change of the weld pool image information with different states during welding; and model establishment specifically comprises:

(1) calculating the centroid of each of the three preprocessed images, and selecting edge points meeting sampling angles, wherein the centroid is calculated as follows:

$$(x_0, y_0) = \left(\frac{|m_{10}|}{|m_{00}|}, \frac{|m_{01}|}{|m_{00}|}\right)$$

a two-dimensional geometric moment $m_{pq}$ of the image is calculated as follows:

$$m_{pq} = \sum_M \sum_N x^p y^q f(x, y)$$

where p and q represent the order of the geometric moment $m_{pg}$, x and y are the coordinates of a pixel, f(x,y) represents a gray value of the pixel here, M and N represent a size of the image, and the size of the image in the embodiment of the present invention is 1390×1040;

after working out the centroid, a ray with the centroid as a starting point and an X positive direction is established in an edge graph, and the ray is rotated at a certain angle until it is rotated by 360° in total, wherein during each time of rotation, an intersection of the ray and the edge is the edge point meeting the sampling angles; in the embodiment of the invention, a total of 100 edge points need to be taken, so one edge point is taken each time the ray is rotated by 3.6° until 100 edge points are obtained.

(2) for the selected edge points, calculating their distances to the centroid respectively, and storing them in the distance data sequences corresponding to the three spectra in turn in angular order, wherein the distance is calculated as follows:

$$d = \sqrt{(x-x_0)^2 - (y-y_0)^2}$$

where (x, y) is the coordinates of the edge point, and ($x_0$, $y_0$) is the coordinates of the centroid;

the distance data sequences corresponding to the three spectra are expressed as the following formula:

$$S_x = \{x_i\}_{i=1}^n$$

$$S_y = \{y_i\}_{i=1}^n$$

$$S_z = \{z_i\}_{i=1}^n$$

where $x_i$, $y_i$ and $z_i$ are distance values corresponding to $i^{th}$ points in the distance data sequences corresponding to the three spectra, and N is a length of a signal, that is, the number of the selected edge points; on this basis, the distance data sequences from the edge of to the centroid of a multispectral weld pool can be uniformly expressed as:

$$s = \{q_n = x_n \cdot i + y_n \cdot j + z_n \cdot k | \eta \in 1, 2, \ldots, n\}$$

besides, $i^2 = j^2 = k^2 = -1$, $j = k = -ji$, $jk = i = -kj$, $ki = j = -ik$, and this expression is the quaternion-based multispectral weld pool image edge model; and C, extracting low-frequency features after a quaternion discrete cosine transformation, wherein a left transformation $F^L(\omega 1, \omega 2)$ and a right transformation $F^R(\omega 1, \omega 2)$ of the quaternion discrete cosine transformation (QDCT) are as follows:

$$F^L(\omega_1, \omega_2) = \delta(\omega_1)\delta(\omega_2) \sum_{x=0}^{m-1}\sum_{y=0}^{n-1} u f(x, y) \cos\left[\frac{\pi(2x+1)\omega_1}{2m}\right]\cos\left[\frac{\pi(2x+1)\omega_2}{2n}\right]$$

$$F^R(\omega_1, \omega_2) = \delta(\omega_1)\delta(\omega_2) \sum_{x=0}^{m-1}\sum_{y=0}^{n-1} f(x, y) \cos\left[\frac{\pi(2x+1)\omega_1}{2m}\right]\cos\left[\frac{\pi(2x+1)\omega_2}{2n}\right] u$$

where u is a unit pure quaternion, $u^2 = -1$, f(x, y) is a corresponding value of (x, y) in a quaternion matrix of m×n to be transformed, $F^L(\omega_1, \omega_2)$ and $F^R(\omega_1, \omega_2)$ are quaternion coefficients in a transformation domain $(\omega_1, \omega_2)$, and $\delta(\omega_1)$ and $\delta(\omega_2)$ are defined as:

$$\delta(\omega_1) = \begin{cases} \sqrt{1/m} & \omega_1 = 0 \\ \sqrt{2/n} & \omega_1 \neq 0 \end{cases}$$

$$\delta(\omega_2) = \begin{cases} \sqrt{1/m} & \omega_2 = 0 \\ \sqrt{2/n} & \omega_2 \neq 0 \end{cases};$$

and after the quaternion discrete cosine transformation is carried out on the quaternion-based multispectral weld pool image edge model, low-frequency components are taken as feature quaternion vectors of weld pool edge data.

After the first part, that is, extracting the low-frequency features of the weld pool images, the second part can be carried out, that is, using a quaternion-based multi-degree-of-freedom neuron network to perform classified recognition on edge features of the multispectral weld pool images.

First, a quaternion-based multi-degree-of-freedom neuron network is constructed by using training samples to obtain two neuron coverage areas with different characterizations, "complete penetration" and "incomplete penetration"; then the extracted low-frequency features of edge data of test samples are input into the network to calculate the Euclidean distance between a sample to be recognized and the two neuron coverage areas, wherein the characterization corresponding to the coverage area with the smallest distance is the characterization to which the test sample belongs; and finally, a recognition result is taken as the output of the MDOFNN.

The three cameras are triggered synchronously to capture images, and the weld pool images captured at the same moment with wavelengths of 808 nm, 830 nm and 850 nm respectively are obtained.

Beneficial Effects

Compared with the prior art, the present invention has the following beneficial effects: (1) There are many sources of identification information. The present invention uses three cameras to obtain spectral information of three frequency bands during the welding process as a signal source reflecting the quality of welding. Compared with the traditional method based on the visible light image, the present invention has more sources of identification information. Due to the coupling between the multi-spectral information, the quaternion method is adopted to make the multi-spectral image information integrally calculated, ensuring the overall multi-spectral image Reaction welding penetration state. (2) There is less interference in identification information. The cameras used in the present invention are all equipped with filters and protective glasses. The selection of these filters and protective glasses is obtained through multiple combined tests. Compared with the traditional method, the identification information of the present invention has less interference. (3) The recognition accuracy is higher. Compared with the recognition algorithm based on the probabilistic neuron network used in the traditional method, the recognition algorithm based on the multi-degree-of-freedom neuron network adopted by the present invention has the advantage of higher accuracy rate, so it combines the first two points Beneficial effects: Compared with the traditional method, the recognition accuracy of the present invention is higher.

DESCRIPTION OF SEVERAL VIEWS OF THE ATTACHED DRAWINGS

Figure 1:
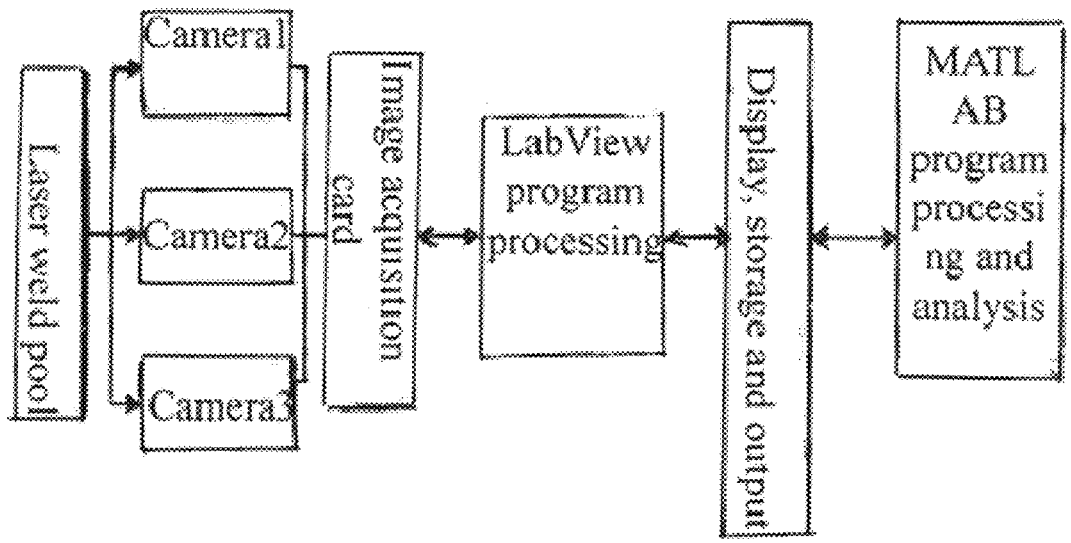
FIG. 1 is a block diagram of an overall design of the present invention.
Figure 2:
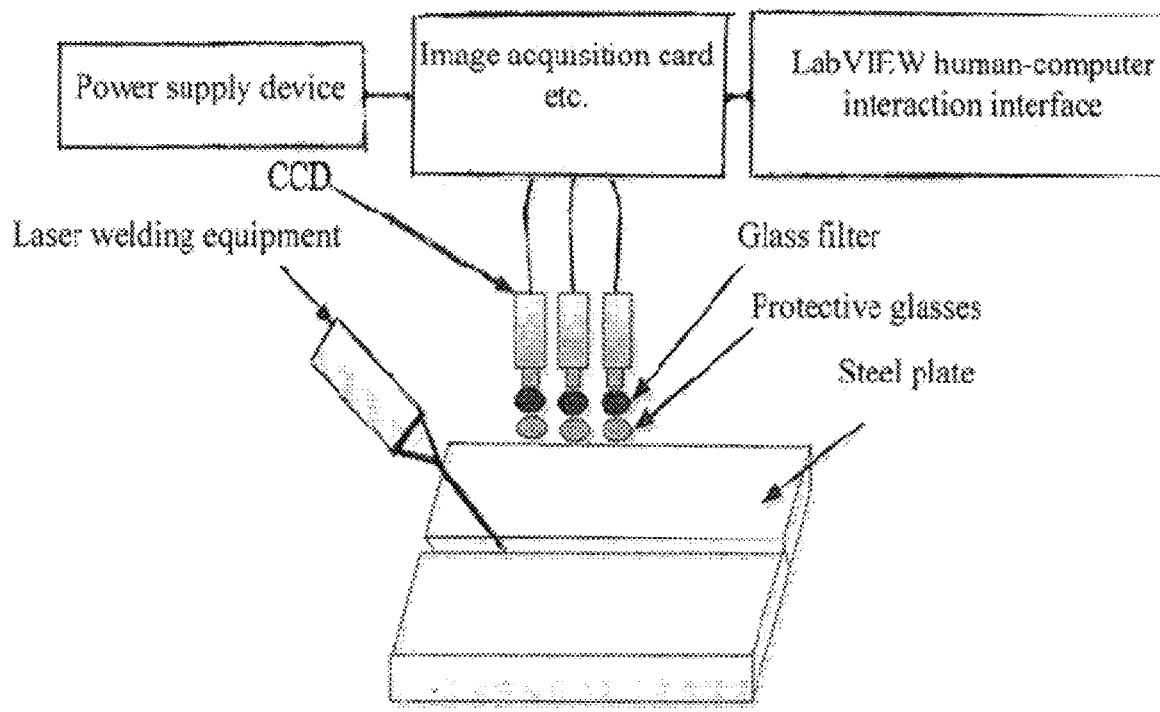
FIG. 2 is a diagram of a hardware structure of the present invention.
Figure 3:
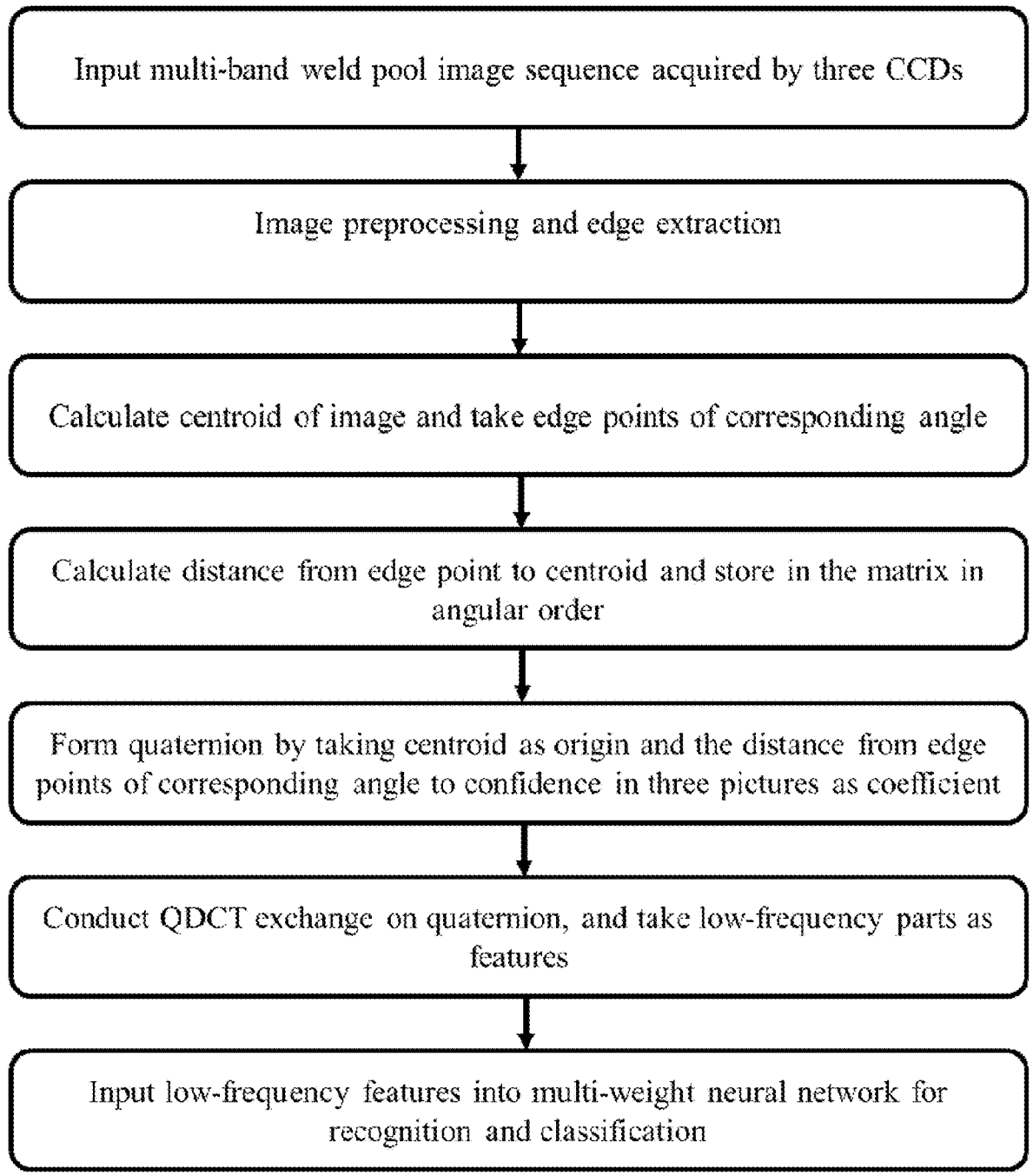
FIG. 3 is an algorithm flow chart in the present invention.
Figure 4:
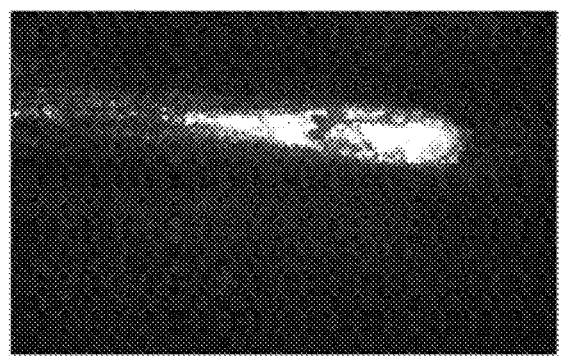
FIG. 4 is an original image of an embodiment of the present invention.
Figure 5:
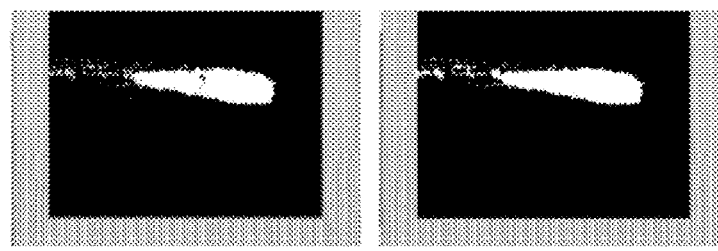
FIG. 5 is an image result after a series of preprocessing according to an embodiment of the present invention.
Figure 5:
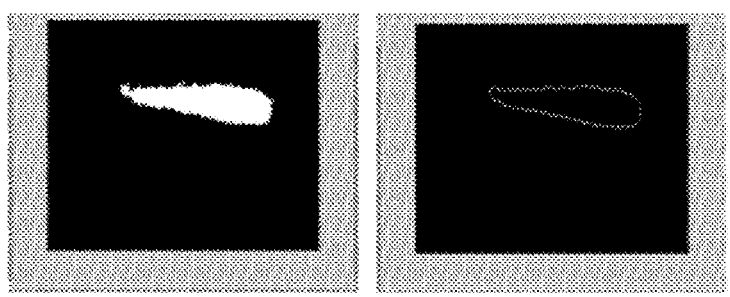
Figure 6:
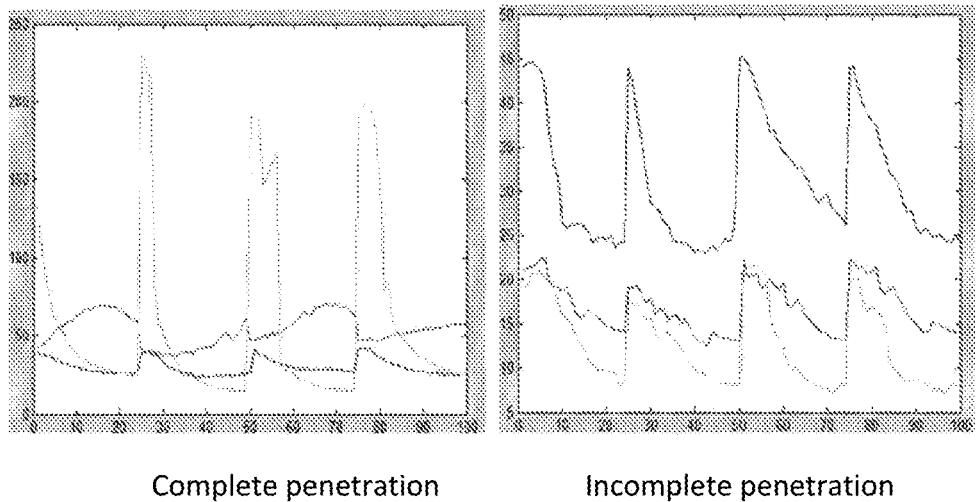
Figure 7:
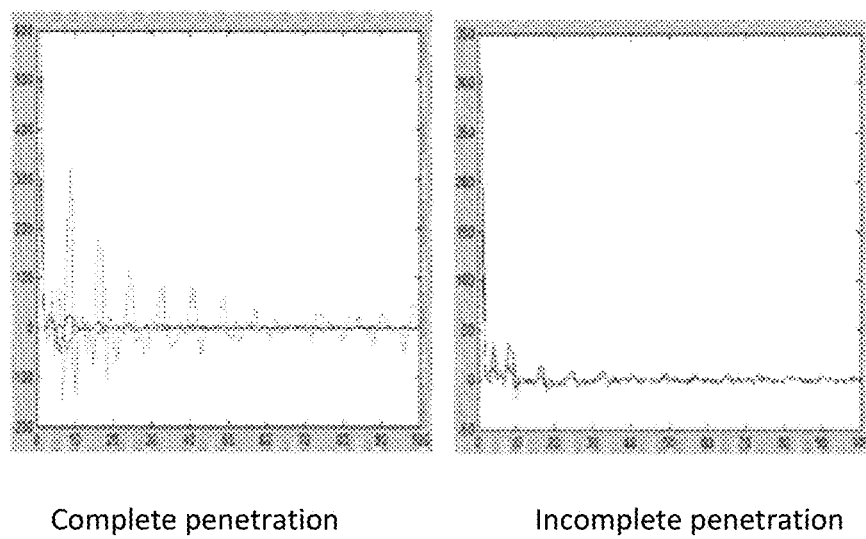

FIG. 6 is a data image of a distance from an edge of a weld pool to a welding center under typical incomplete penetration and complete penetration states of the weld pool according to an embodiment of the present invention; and FIG. 7 is a sample image after low-frequency features are extracted under typical incomplete penetration and complete penetration states of a weld pool according to an embodiment of the present invention.

DETAILED DESCRIPTION OF THE INVENTION

According to a quaternion multi-degree-of-freedom neuron-based multispectral welding image recognition method, firstly three cameras corresponding to different wave bands are controlled by a LabVIEW program to obtain the image information of a weld pool respectively, then an image acquisition card is used for putting the information together and uploading the information, and finally images of different wave bands captured at a same moment are processed by a MATLAB program to obtain and display a weld pool image recognition result.

A steel plate to be welded is laid flat below; laser welding equipment is located above and faces the steel plate; the three cameras equipped with glass filters and protective glasses are arranged side by side and vertically aligned with a portion to be subject to laser welding; an upper computer uses the LabVIEW program to acquire and control the states of the three cameras through the image acquisition card; a corresponding power supply device provides power;

The three cameras are triggered synchronously to capture images, and the weld pool images captured at the same moment with wavelengths of 808 nm, 830 nm and 850 nm respectively are obtained.

The multispectral weld pool images obtained by the three cameras are processed by the MATLAB program, to obtain and display the weld pool image recognition result. The processing is divided into two parts:

The first part is to extract the low-frequency features of the weld pool images, comprising:

A, preprocessing the weld pool images captured by the three cameras at the same moment, wherein an original image is binarized first, then is expanded and corroded by means of morphological operation, and then subject to area threshold filtering to complete the image preprocessing, and finally, weld pool edge information is extracted from the preprocessed images by scanning from outside to inside line by line;

B, establishing a quaternion-based multispectral weld pool image edge model, wherein for sampling points at any moment, the distance data from an edge to a centroid of each of the weld pool images with different spectra obtained by the three cameras can be expressed as a pure imaginary quaternion, so the distance sequences from the edge to the centroid of each of the weld pool images with three spectral ranges corresponding to different categories can be combined and mapped on a quaternion space, and the change of a quaternion vector sequence can be characterized as the change of the weld pool image information with different states during welding; and model establishment specifically comprises:

(1) calculating the centroid of each of the three preprocessed images, and selecting edge points meeting sampling angles, wherein the centroid is calculated as follows:

$$(x_0, y_0) = \left( \frac{|m_{10}|}{|m_{00}|}, \frac{|m_{01}|}{|m_{00}|} \right)$$

a two-dimensional geometric moment $m_{pq}$ of the image is calculated as follows:

$$m_{pq} = \sum_M \sum_N x^p y^q f(x, y)$$

where p and q represent the order of the geometric moment $m_{pg}$, x and y are the coordinates of a pixel, f(x,y) represents a gray value of the pixel here, M and N represent a size of the image, and the size of the image in the embodiment of the present invention is 1390×1040;

after working out the centroid, a ray with the centroid as a starting point and an X positive direction is established in an edge graph, and the ray is rotated at a certain angle until it is rotated by 360° in total, wherein during each time of rotation, an intersection of the ray and the edge is the edge point meeting the sampling angles; in the embodiment of the invention, a total of 100 edge points need to be taken, so one edge point is taken each time the ray is rotated by 3.6° until 100 edge points are obtained.

(2) for the selected edge points, calculating their distances to the centroid respectively, and storing them in the distance data sequences corresponding to the three spectra in turn in angular order, wherein the distance is calculated as follows:

$$d = \sqrt{(x-x_0)^2 - (y-y_0)^2}$$

where (x, y) is the coordinates of the edge point, and ($x_0$, $y_0$) is the coordinates of the centroid;

the distance data sequences corresponding to the three spectra are expressed as the following formula:

$$S_x = \{x_i\}_{i=1}^n$$

$$S_y = \{y_i\}_{i=1}^n$$

$$S_z = \{z_i\}_{i=1}^n$$

where $x_i$, $y_i$ and $z_i$ are distance values corresponding to $i^{th}$ points in the distance data sequences corresponding to the three spectra, and N is a length of a signal, that is, the number of the selected edge points; on this basis, the distance data sequences from the edge of to the centroid of a multispectral weld pool can be uniformly expressed as:

$$s = \{q_n = x_n \cdot i + y_n \cdot j + z_n \cdot k | \eta \in 1, 2, \ldots, n\}$$

besides, $i^2 = j^2 = k^2 = -1$, $j = k = -ji$, $jk = i = -kj$, $ki = j = -ik$, and this expression is the quaternion-based multispectral weld pool image edge model; and C, extracting low-frequency features after a quaternion discrete cosine transformation, wherein a left transformation $F^L(\omega 1, \omega 2)$ and a right transformation $F^R(\omega 1, \omega 2)$ of the quaternion discrete cosine transformation (QDCT) are as follows:

$$F^L(\omega_1, \omega_2) = \delta(\omega_1)\delta(\omega_2) \sum_{x=0}^{m-1} \sum_{y=0}^{n-1} uf(x, y) \cos\left[\frac{\pi(2x+1)\omega_1}{2m}\right] \cos\left[\frac{\pi(2x+1)\omega_2}{2n}\right]$$

$$F^R(\omega_1, \omega_2) = \delta(\omega_1)\delta(\omega_2) \sum_{x=0}^{m-1} \sum_{y=0}^{n-1} f(x, y) \cos\left[\frac{\pi(2x+1)\omega_1}{2m}\right] \cos\left[\frac{\pi(2x+1)\omega_2}{2n}\right] u$$

where u is a unit pure quaternion, $u^2 = -1$, f(x, y) is a corresponding value of (x, y) in a quaternion matrix of m×n to be transformed, $F^L(\omega_1, \omega_2)$ and $F^R(\omega_1, \omega_2)$ are quaternion coefficients in a transformation domain ($\omega_1$, $\omega_2$), and $\delta(\omega_1)$ and $\delta(\omega_2)$ are defined as:

$$\delta(\omega_1) = \begin{cases} \sqrt{1/m} & \omega_1 = 0 \\ \sqrt{2/n} & \omega_1 = 0 \end{cases}$$

$$\delta(\omega_2) = \begin{cases} \sqrt{1/m} & \omega_2 = 0 \\ \sqrt{2/n} & \omega_2 \neq 0 \end{cases};$$

and after the quaternion discrete cosine transformation is carried out on the quaternion-based multispectral weld pool image edge model, low-frequency components are taken as feature quaternion vectors of weld pool edge data.

FIG. 6 shows the edge distance data under typical incomplete penetration and complete penetration states of a weld pool according to an embodiment of the present invention, in which curves of three colors correspond to three spectra, the abscissa is the serial number of the edge point, and the ordinate is the distance between the point and the centroid.

FIG. 7 shows the data after the quaternion discrete cosine transformation of the edge distance data under typical incomplete penetration and complete penetration states of a weld pool according to an embodiment of the present invention, in which curves of three color correspond to three spectra, the abscissa is the serial number of the edge point, and the ordinate is the data value after change.

After the first part, that is, extracting the low-frequency features of the weld pool images, the second part can be carried out, that is, using a quaternion-based multi-degree-of-freedom neuron network to perform classified recognition on edge features of the multispectral weld pool images.

As shown in FIG. 7, from the analysis of the low-frequency feature data under typical incomplete penetration and complete penetration states of the weld pool, the sample data characterization difference between incomplete penetration and complete penetration states is quite large, so a multi-degree-of-freedom neuron network (MDOFNN) can be adopted for classified recognition.

First, a quaternion-based multi-degree-of-freedom neuron network is constructed by using training samples to obtain two neuron coverage areas with different characterizations, "complete penetration" and "incomplete penetration"; then the extracted low-frequency features of edge data of test samples are input into the network to calculate the Euclidean distance between a sample to be recognized and the two neuron coverage areas, wherein the characterization corresponding to the coverage area with the smallest distance is the characterization to which the test sample belongs; and finally, a recognition result is taken as the output of the MDOFNN.

What is claimed is:

1. A quaternion multi-degree-of-freedom neuron-based multispectral welding image recognition method, which is characterized in that: a steel plate to be welded is laid flat below; laser welding equipment is located above and faces the steel plate; the three cameras equipped with glass filters and protective glasses are arranged side by side and vertically aligned with a portion to be subject to laser welding; an upper computer uses the LabVIEW program to acquire and control the states of the three cameras through the image acquisition card; a corresponding power supply device provides power;

the multispectral weld pool images obtained by the three cameras are processed by the MATLAB program, to obtain and display the weld pool image recognition result; The processing is divided into two parts:

the first part is to extract the low-frequency features of the weld pool images, comprising:

A, preprocessing the weld pool images captured by the three cameras at the same moment, wherein an original image is binarized first, then is expanded and corroded by means of morphological operation, and then subject to area threshold filtering to complete the image preprocessing, and finally, weld pool edge information is extracted from the preprocessed images by scanning from outside to inside line by line;

B, establishing a quaternion-based multispectral weld pool image edge model, wherein for sampling points at any moment, the distance data from an edge to a centroid of each of the weld pool images with different spectra obtained by the three cameras can be expressed as a pure imaginary quaternion, so the distance sequences from the edge to the centroid of each of the weld pool images with three spectral ranges corresponding to different categories can be combined and mapped on a quaternion space, and the change of a quaternion vector sequence can be characterized as the change of the weld pool image information with different states during welding; and model establishment specifically comprises:

(1) calculating the centroid of each of the three preprocessed images, and selecting edge points meeting sampling angles, wherein the centroid is calculated as follows:

$$(x_0, y_0) = \left(\frac{|m_{10}|}{|m_{00}|}, \frac{|m_{01}|}{|m_{00}|}\right)$$

a two-dimensional geometric moment $m_{pq}$ of the image is calculated as follows:

$$m_{pq} = \sum_M \sum_N x^p y^q f(x, y)$$

where p and q represent the order of the geometric moment $m_{pq}$, x and y are the coordinates of a pixel, f(x,y) represents a gray value of the pixel here, M and N represent a size of the image, and the size of the image in the embodiment of the present invention is 1390×1040;

after working out the centroid, a ray with the centroid as a starting point and an X positive direction is established in an edge graph, and the ray is rotated at a certain angle until it is rotated by 360° in total, wherein during each time of rotation, an intersection of the ray and the edge is the edge point meeting the sampling angles; in the embodiment of the invention, a total of 100 edge points need to be taken, so one edge point is taken each time the ray is rotated by 3.6° until 100 edge points are obtained;

(2) for the selected edge points, calculating their distances to the centroid respectively, and storing them in the distance data sequences corresponding to the three spectra in turn in angular order, wherein the distance is calculated as follows:

$$d = \sqrt{(x-x_0)^2 - (y-y_0)^2}$$

where (x, y) is the coordinates of the edge point, and $(x_0, y_0)$ is the coordinates of the centroid;

the distance data sequences corresponding to the three spectra are expressed as the following formula:

$$S_x = \{x_i\}_{i=1}^n$$

$$S_y = \{y_i\}_{i=1}^n$$

$$S_z = \{z_i\}_{i=1}^n$$

where $x_i$, $y_i$ and $z_i$ are distance values corresponding to $i^{th}$ points in the distance data sequences corresponding to the three spectra, and N is a length of a signal, that is, the number of the selected edge points; on this basis, the distance data sequences from the edge of to the centroid of a multispectral weld pool can be uniformly expressed as:

$$s = \{q_n = x_n \cdot i + y_n \cdot j + z_n \cdot k | n \in 1, 2, \ldots, n\}$$

besides, $i^2 = j^2 = k^2 = -1$, $j = k = -ji$, $jk = i = -kj$, $ki = j = -ik$, and this expression is the quaternion-based multispectral weld pool image edge model; and C, extracting low-frequency features after a quaternion discrete cosine transformation, wherein a left transformation $F^L(\omega 1, \omega 2)$ and a right transformation $F^R(\omega 1, \omega 2)$ of the quaternion discrete cosine transformation (QDCT) are as follows:

$$F^L(\omega_1, \omega_2) = \delta(\omega_1)\delta(\omega_2)\sum_{x=0}^{m-1}\sum_{y=0}^{n-1} uf(x, y)\cos\left[\frac{\pi(2x+1)\omega_1}{2m}\right]\cos\left[\frac{\pi(2x+1)\omega_2}{2n}\right]$$

$$F^R(\omega_1, \omega_2) = \delta(\omega_1)\delta(\omega_2)\sum_{x=0}^{m-1}\sum_{y=0}^{n-1} f(x, y)\cos\left[\frac{\pi(2x+1)\omega_1}{2m}\right]\cos\left[\frac{\pi(2x+1)\omega_2}{2n}\right]u$$

where u is a unit pure quaternion, $u^2=-1$, f(x, y) is a corresponding value of (x, y) in a quaternion matrix of m×n to be transformed, $F^L(\omega_1, \omega_2)$ and $F^R(\omega_1, \omega_2)$ are quaternion coefficients in a transformation domain $(\omega_1, \omega_2)$, and $\delta(\omega_1)$ and $\delta(\omega_2)$ are defined as:

$$\delta(\omega_1) = \begin{cases} \sqrt{1/m} & \omega_1 = 0 \\ \sqrt{2/n} & \omega_1 \neq 0 \end{cases}$$

$$\delta(\omega_2) = \begin{cases} \sqrt{1/m} & \omega_2 = 0 \\ \sqrt{2/n} & \omega_2 \neq 0 \end{cases};$$

and after the quaternion discrete cosine transformation is carried out on the quaternion-based multispectral weld pool image edge model, low-frequency components are taken as feature quaternion vectors of weld pool edge data;

after the first part, that is, extracting the low-frequency features of the weld pool images, the second part can be carried out, that is, using a quaternion-based multi-degree-of-freedom neuron network to perform classified recognition on edge features of the multispectral weld pool images;

first, a quaternion-based multi-degree-of-freedom neuron network is constructed by using training samples to obtain two neuron coverage areas with different characterizations, "complete penetration" and "incomplete penetration"; then the extracted low-frequency features of edge data of test samples are input into the network to calculate the Euclidean distance between a sample to be recognized and the two neuron coverage areas, wherein the characterization corresponding to the coverage area with the smallest distance is the characterization to which the test sample belongs; and finally, a recognition result is taken as the output of the MDOFNN.

2. The quaternion multi-degree-of-freedom neuron-based multispectral welding image recognition method according to claim 1, which is characterized in that: the three cameras are triggered synchronously to capture images, and the weld pool images captured at the same moment with wavelengths of 808 nm, 830 nm and 850 nm respectively are obtained.

* * * * *